(12) United States Patent
Nakamura et al.

(10) Patent No.: US 6,433,823 B1
(45) Date of Patent: Aug. 13, 2002

(54) SOLID STATE IMAGE SENSING DEVICE AND IMAGE SENSING METHOD

(75) Inventors: Satoshi Nakamura, Ikeda; Kenji Takada, Itami, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 08/920,284

(22) Filed: Aug. 26, 1997

(30) Foreign Application Priority Data

Aug. 26, 1996 (JP) .............................. 8-223389

(51) Int. Cl.[7] .............................................. H04N 5/202
(52) U.S. Cl. ....................................... 348/254; 348/674
(58) Field of Search ................................ 348/302, 308, 348/254, 674; 358/519

(56) References Cited

U.S. PATENT DOCUMENTS 5,289,286 A  2/1994  Nakamura et al. .......... 348/223
5,481,317 A * 1/1996  Hieda .......................... 348/674
5,726,759 A * 3/1998  Watanabe .................... 358/296

FOREIGN PATENT DOCUMENTS

| JP | 63-046074 | 2/1988 |
|----|-----------|--------|
| JP | 05-167848 | 7/1993 |

* cited by examiner

*Primary Examiner*—Wendy R. Garber
*Assistant Examiner*—Alicia M. Harrington
(74) *Attorney, Agent, or Firm*—Sidley Austin Brown & Wood

(57) ABSTRACT

A solid state image sensing device provided with a gamma correction circuit which corrects a logarithmically converted value derived from the logarithmic conversion of individual pixel data output from individual photoelectric conversion elements, thereby easily correcting discrepancies and differences in the gamma characteristics of the individual pixels of a photoelectric conversion element which converts a light signal to an electrical signal.

10 Claims, 5 Drawing Sheets

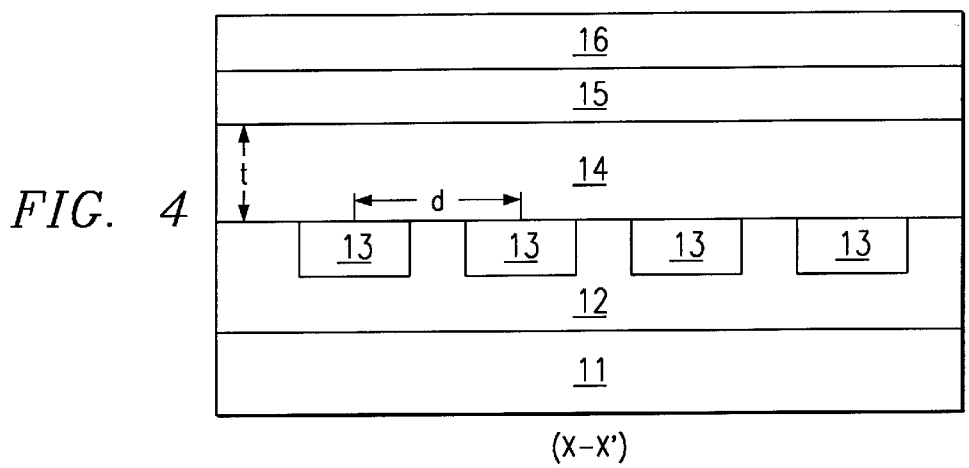
FIG. 4
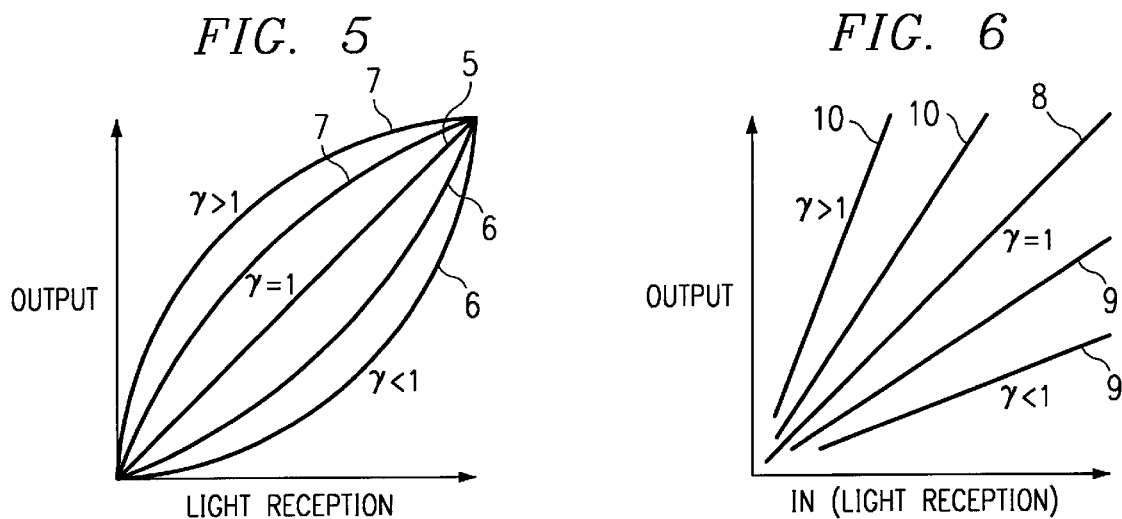
FIG. 5
FIG. 6
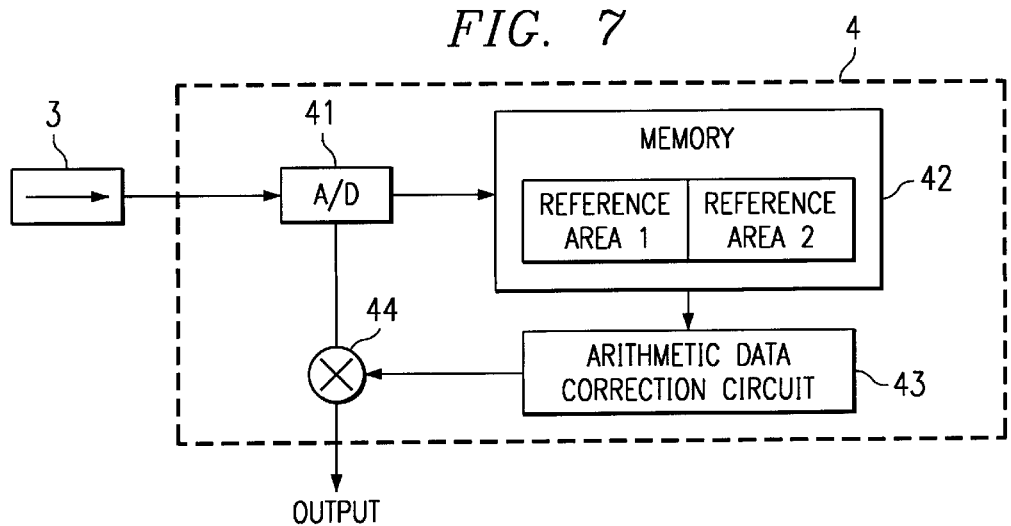
FIG. 7

SOLID STATE IMAGE SENSING DEVICE AND IMAGE SENSING METHOD

BACKGROUND OF THE INVENTION

1. Field of the Invention

The present invention relates to a solid state image sensing device and specifically relates to a solid state image sensing device possessing a gamma correction means for correcting discrepancies in the gamma characteristics of individual pixels pertaining thereto.

2. Description of the Related Art

Among heretofore used solid state image sensing devices, there are no instances in which the gamma characteristics of individual pixels differ and therefore no such devices that carry out gamma correction for individual pixels. If, however, the use of a photoelectric conversion film engendered a situation in which the gamma characteristics of individual pixels differed, then gamma characteristics would have to be corrected for each pixel, and each pixel would require a different non-linear conversion to carry out such correction in a solid state image sensing device wherein an output corresponding to a quantity of incident light is converted to linear form.

However, carrying out a non-linear conversion is impractical inasmuch as it generally involves a method employing a look-up table, which constitutes an enormous quantity of data for the gamma correction alone, and processing is extremely complex and cumbersome.

A first object of the present invention is to provide a solid state image sensing device capable of easy correction of different gamma characteristics in individual pixels.

In order to achieve the aforementioned object, the solid state image sensing device is furnished with a plurality of elements which receive a light signal and output an electrical signal corresponding to the amount of light received, and said solid state image sensing device comprises:

a plurality of photoelectric conversion elements having individual gamma characteristics for each elements;

a logarithmic conversion unit which performs a logarithmic conversion of, respectively, an electrical signal generated in the photoelectric conversion element and the output from each photoelectric conversion element; and a gamma correction circuit which corrects discrepancies in the gamma characteristics of the output from each photoelectric conversion element, said output having undergone the logarithmic conversion by the logarithmic conversion unit.

Due to the aforementioned construction, a logarithmic conversion unit provides a logarithmic conversion for each pixel in an electrical signal output by a photoelectric conversion element, and said electrical signal attains a linearity corresponding to the logarithm of a light signal. Furthermore, the slope of this linearity depends on the gamma characteristics of the photoelectric conversion element, and therefore the gamma characteristics of the photoelectric conversion element can be corrected by correcting the linear slope, that is, through multiplication and division operations alone.

These and other objects, advantages, and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIG. 4 is a X–X' cross-sectional view of the plane view shown in FIG. 2;

FIG. 5 is a graph showing, for various gamma characteristics, the relationship between light reception and output in a photoelectric conversion element;

FIG. 6 is a graph showing, for various gamma characteristics, the relationship between light reception and output in a photoelectric conversion element when the output of the photoelectric conversion element has undergone a logarithmic conversion;

FIG. 7 is a block diagram showing a first schematic example of gamma correction circuit 4;

DETAILED DESCRIPTION OF THE PREFERRED EMBODIMENTS

Figure 1:
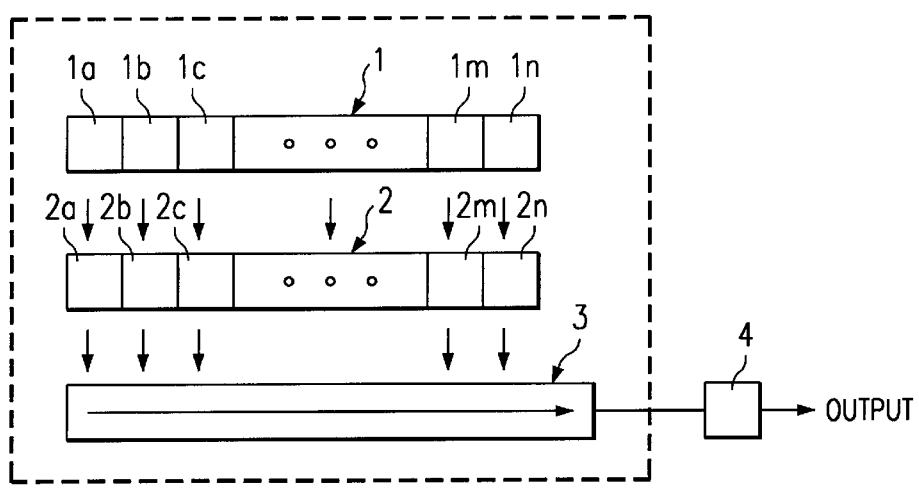
FIG. 1 is a block diagram of a solid state image sensing device which is a preferred embodiment of the present invention.

A preferred embodiment of the present invention is described hereinafter with reference to the drawings. FIG. 1 is a block diagram of a solid state image sensing device which is a preferred embodiment of the present invention, wherein numbered element 1 is a photosensitive unit comprising a plurality of photoelectric conversion elements 1a through 1n whose output current (photoelectric current) changes according to their respective light reception. Photoelectric conversion elements 1a–1n may be photodiodes having PN junctions and may comprise a layered structure, or the light-receiving unit may employ an amorphous material and the light-receiving unit itself may have a structure which amplifies photoelectric current, or the light-receiving unit may be one with a gamma characteristic such that $\gamma \neq 1$; i.e., exhibits non-linear behavior.

Figure 2:
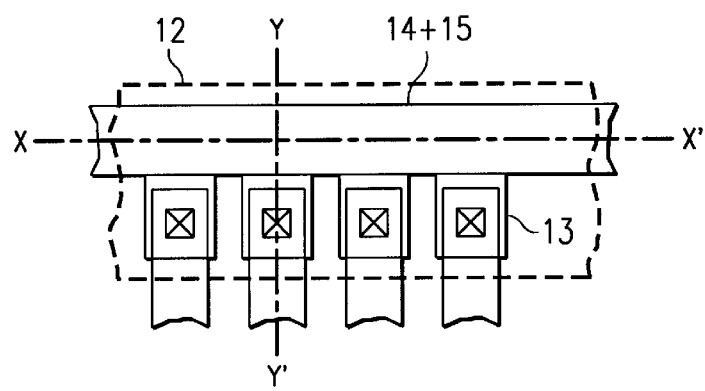
FIG. 2 is a plane view showing the structure of photoelectric conversion elements which are the pixel units of a photosensitive unit.
Figure 3:
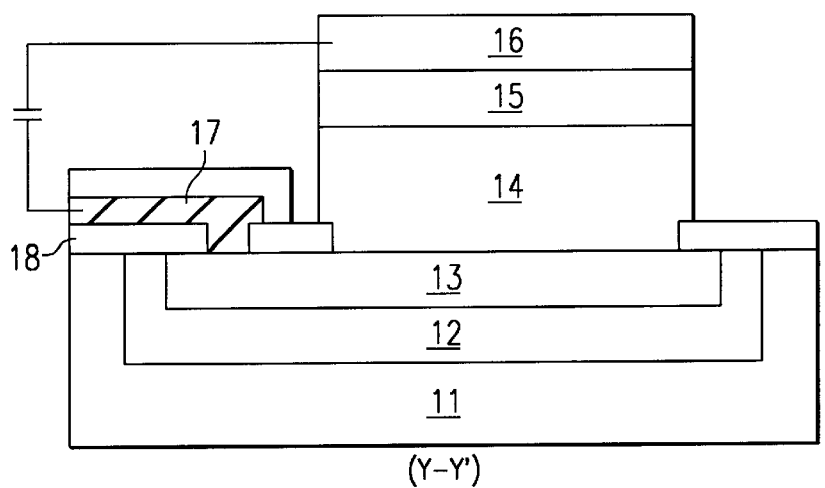
FIG. 3 is a Y–Y' cross-sectional view of the plane view shown in FIG. 2.

A specific example of photosensitive unit 1 comprising photoelectric conversion elements 1a–1n is discussed using FIG. 2 through FIG. 4. FIG. 2 is a plane view showing the structure of the several photoelectric conversion elements 1a–1n in photosensitive unit 1. FIG. 3 shows a Y–Y' cross-section thereof, and FIG. 4 shows an X–X' cross-section thereof. Here, 11 is a p-type semiconductor substrate, 12 is an n-well region formed on a p-type semiconductor substrate by an ion injection or heat dispersion method, 13 is a p-type impurity dispersion layer formed within n-well region 12 by an ion injection or heat dispersion method, 14 is an i-type semiconductor thin film serving as a photoelectric conversion layer, 15 is an n-type semiconductor thin film, 16 is a transparent electrode, and 17 is an Al (aluminum) electrode. The i-type semiconductor thin film is made from a non-doped semiconductor material, and the i-type semiconductor thin film 14 in the present embodiment has a high resistance and is made from a-Si:H with a high absorption coefficient for visible light, c-Si, or a polysilicone or single crystalline Si layer or the like. The n-type semiconductor thin film 15 transmits incident light and is made from an electrically conductive material. The material used in n-type semiconductor thin film 15 may be a-SiC or a-SiC:H used in solar cells, or c-SiC:H, or c-Si:H or the like. In particular, a material such as a-SiC with its wide band gap is used in preference to silicone. Transparent electrode 16 is made from ITO(Indium Tin Oxide) or $SnO_2$ or the like. The type semiconductor thin film 14 absorbs incident light from transparent electrode 16, creating electron hole pairs. Because a positive voltage is applied to transparent electrode 16, the hole formed moves towards p-type impurity dispersion layer 13, and the electron moves towards transparent electrode 16. This process creates a chain-reaction propagation. The carrier formed in i-type semiconductor thin film 14 is removed as photoelectric current by aluminum electrode 17.

Aluminum electrode 17 is connected to logarithmic conversion circuits $2a$ through $2n$. Numbered element 18 is an insulating film employing a thermal oxidation film such as $SiO_2$ or SiN.

In the photoelectric conversion element, p-type impurity dispersion layer 13 separates pixels, obviating the need for a pixel electrode as in conventional solid state image sensing devices. In addition, p-type impurity dispersion layer 13 is furnished within n-well region 12 such that i-type semiconductor thin film 14 is in direct contact with both p-type impurity dispersion layer 13 and n-well region 12.

The bed for i-type semiconductor thin film 14 is also even, thereby preventing discrepancies in the electrical output of the sensor caused by an uneven bed for the photoelectric conversion layer, as in conventional, layer-type, solid state image sensing devices.

In FIG. 4, p-type impurity dispersion layer 13 comprises a single pixel formed within n-well region 12 in photosensitive unit 1, and the figure intends to illustrate several such elements aligned horizontally. A pixel unit in the solid state image sensing device comprises a plurality of photoelectric conversion units corresponding to individual pixels. The figure also intends to illustrate that a film layered thereon is formed so that it contacts both n-well region 12 and p-type impurity dispersion layer 13, joining each pixel. Because i-type semiconductor thin film 14 has a high resistance, and because the distance d between pixels is wider than the film thickness t of the thin film, a carrier formed by photoelectric conversion in i-type semiconductor thin film 14 reaches p-type impurity dispersion layer 13 nearly free from horizontal dispersion. Specifically, as shown in FIG. 4, distance d is approximately 5–10 $\mu$m, and film thickness t is approximately 1 $\mu$m.

Numbered element 2 shown in FIG. 1 is a logarithmic conversion unit comprising the same number of logarithmic conversion elements $2a$–$2n$ as photoelectric conversion elements $1a$–$1n$ which comprise photosensitive unit 1, and logarithmic conversion unit 2 performs a logarithmic conversion on the output of each photoelectric conversion element $1a$–$1n$ of photosensitive unit 1 and outputs the result. Numbered element 3 is a sequential reading means which sequentially scans and reads the output of photoelectric conversion elements $1a$–$1n$ in photosensitive unit 1 once said output has passed through logarithmic conversion unit 2, and sequential reading means 3 employs a CCD element or a MOSFET-operated switching circuit for this purpose.

Numbered element 4 is a gamma correction circuit which performs defined processing on the output of photoelectric conversion elements $1a$–$1n$ of photosensitive unit 1 once said output has passed through logarithmic conversion unit 2 and is sequentially read by sequential reading means 3. Gamma correction circuit 4 then outputs the result. A description of such processing is given below, however, said gamma correction circuit 4 provides the output of photoelectric conversion elements $1a$–$1n$ of photosensitive unit 1 with linearity of a defined slope corresponding to the logarithm of the amount of light originally received. In other words, the gamma characteristics resulting from photoelectric conversion elements $1a$–$1n$ of photosensitive unit 1 are corrected to defined gamma characteristics.

As illustrated by reference number 5 in FIG. 5, the output corresponding to L, the amount of light received by photoelectric conversion elements $1a$–$1n$ comprising photosensitive unit 1, is linear when the gamma characteristic of these elements equals 1, and when $\gamma<1$ or $\gamma>1$, as shown respectively by reference numbers 6 and 7 in FIG. 5, said output is non-linear. However, logarithmic conversion unit 2 performs a logarithmic conversion for the output of each photoelectric conversion element $1a$–$1n$. Thus, the output thereof corresponds to in(L), the logarithm of light quantity L, and said output retains linearity when $\gamma=1$, as shown by reference number 8 in FIG. 6. When $\gamma<1$ or $\gamma>1$, too, said output also retains linearity, as shown by reference numbers 9 and 10 in FIG. 6, respectively. Thus, the gamma characteristics of the photoelectric conversion elements are expressed as linear slopes.

Consequently, the gamma characteristics of the photoelectric conversion elements are corrected by correcting the linear slopes pertaining to photoelectric conversion elements $1a$–$1n$; i.e., simply by multiplying and dividing the output of photoelectric conversion elements $1a$–$1n$ of photosensitive unit 1 once said output has passed through logarithmic conversion unit 2.

Gamma correction circuit 4 carries out this processing, and gamma correction circuit 4 is described below. FIG. 7 shows a first schematic example of gamma correction circuit 4. In the figure, 41 is an analog-to-digital (A/D) converter which converts the output of sequential reading means 3 into digital data. Numbered element 42 is a memory which stores digital data sent from A/D converter 41, and its data storage area is segmented into reference area 1 and reference area 2. Numbered element 43 is a corrected data calculation circuit which performs defined calculations based on data transferred from memory 42 and outputs the results of these calculations to multiplier unit 44 next mentioned. Numbered element 44 is a multiplier unit which multiplies the output from A/D converter 41 and the output from arithmetic data correction circuit 43 and outputs the result, which becomes the output from gamma correction circuit 4.

In the aforementioned structure, a uniform beam (I) is first projected on photosensitive unit 1, and logarithmic conversion unit 2 performs a logarithmic conversion on the output from photoelectric conversion elements $1a$–$1n$ of photosensitive unit 1. Said output is then sequentially read by sequential reading means 3, converted to digital data by A/D converter 41 in gamma correction circuit 4, and stored in reference area 1 of memory 42. Next, a uniform beam (II) of a different brightness from the uniform beam (I) is projected on photosensitive unit 1, and logarithmic conversion unit 2 performs a logarithmic conversion on the output from photoelectric conversion elements 1a–1n of photosensitive unit 1. Said output is then sequentially read by sequential reading means 3, converted to digital data by A/D converter 41 in gamma correction circuit 4, and stored in reference area 2 of memory 42. These operations are controlled by a controller not illustrated, and digital data from A/D converter 41 is stored in reference area 1 and reference area 2 of memory 42 for each output of photoelectric conversion elements 1a–1n. In this step, the output from A/D converter 41 is also transferred to multiplier unit 44.

When the foregoing operations are complete, image sensing on a medium to be copied begins, and the output from photoelectric conversion elements 1a–1n of photosensitive unit 1, which has passed through logarithmic conversion unit 2, is sequentially read from sequential reading means 3 and input to A/D converter 41 of gamma correction circuit 4. In gamma correction circuit 4, the following processing is carried out for each input to A/D converter 41, while a controller not illustrated maintains synchronization. A/D converter 41 converts the output from the photoelectric conversion elements of photosensitive unit 1 to digital data and outputs said data to multiplier unit 44. At such time, digital data converted in A/D converter 41 are not transferred to memory 42. Simultaneously, among digital data stored in reference area 1 and reference area 2 of memory 42, digital data from photoelectric conversion elements corresponding to output read from sequential reading means 3 are transferred to arithmetic data correction circuit 43, and arithmetic data correction circuit 43 calculates the expression a/|(reference area 1 data αm)−(reference area 2 data βm)| and outputs the result to multiplier unit 44. Here, "a" is a selected constant and determines the number of output bits for gamma correction circuit 4. Multiplier unit 44 multiplies digital data from A/D converter 41 and the above-noted calculated data from arithmetic data correction circuit 43 and outputs the result.

Figure 11:
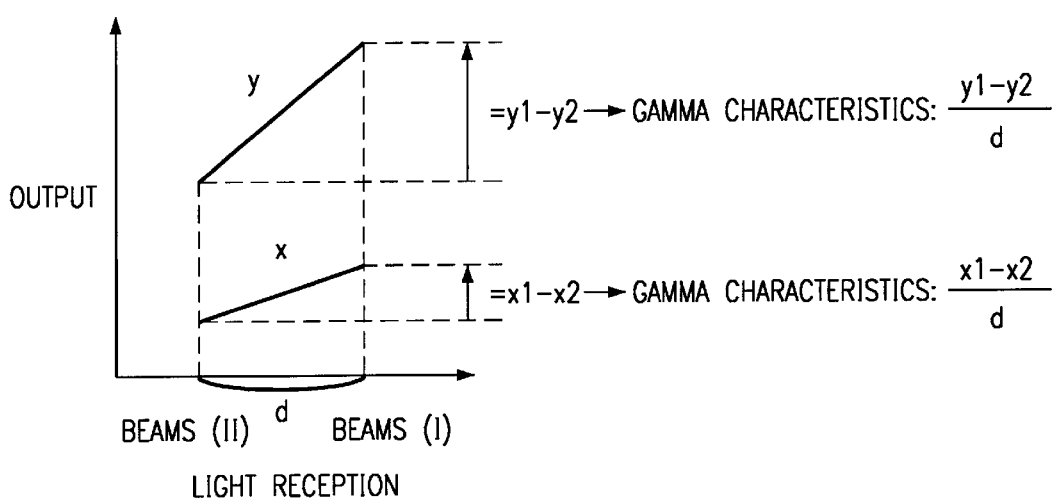
FIG. 11 is a reference graph used to describe the principles of the gamma characteristic correction.

The data stored in reference area 1 and reference area 2 of memory 42 are output from the photoelectric conversion elements of photosensitive unit 1 during projection of uniform beams (I) and (II) (subjected to logarithmic conversion processing by logarithmic conversion unit 2) and converted to digital data by A/D converter 41. If these data for a given photoelectric conversion element X are termed x1, x2, and these data for another photoelectric conversion element Y are termed y1y2, when the output data pertaining to photoelectric conversion element X are multiplied by (y1−y2)/(x1−x2), the gamma characteristics of pixel X are combined with those of pixel Y (see FIG. 11).

Thus, all data in the multiplication processing in multiplier unit 44, specifically, the digital data from A/D converter 41, the a/|(reference area 1 data αm)−(reference area 2 data βm)| result from arithmetic data correction circuit 43, and the (reference area 1 data αm) and (reference area 2 data βm) elements in the denominator of the data from arithmetic data correction circuit 43, are based on identical output from photoelectric conversion elements. Thus, this processing corrects the gamma characteristics of photoelectric conversion elements 1a–1n of photosensitive unit 1 to defined gamma characteristics.

Figure 8:
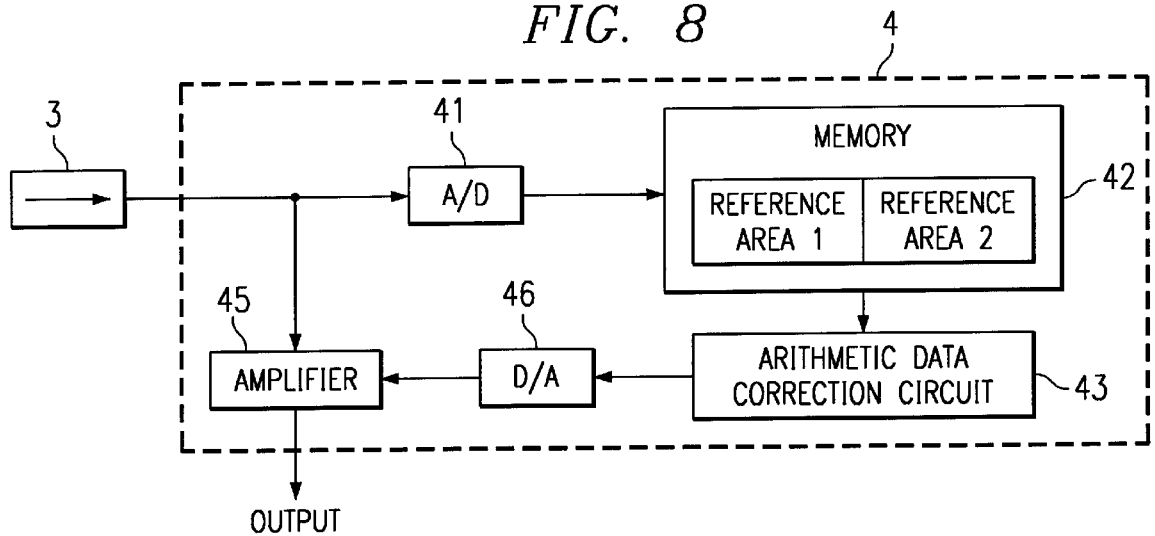
FIG. 8 is a block diagram showing a second schematic example of gamma correction circuit 4.

A second schematic example of gamma correction circuit 4 is next shown in FIG. 8. The description is abbreviated by assigning identical numbers to items identical to those in the first schematic example. In the drawings, 45 is an amplifier, 46 is a D/A converter, amplifier 45 amplifies the output of sequential reading means 3, its gain is converted to analog data by D/A converter 46, and control is exercised by means of the output of arithmetic data correction circuit 43. The output of amplifier 45 then serves as the output of gamma correction circuit 4.

In the aforementioned structure, processing when the uniform beams (I) and (II) are respectively projected on photosensitive unit 1 is identical to processing in the first schematic example, but when image sensing on a medium to be copied begins, the output from photoelectric conversion elements 1a–1n of photosensitive unit 1, read by sequential reading means 3 and input to gamma correction circuit 4, is not input to A/D converter 41 but input directly to amplifier 45. At the same time, data calculated by arithmetic data correction circuit 43 are converted to analog data by D/A converter 46 and output to amplifier 45, and the gain of amplifier 45 is controlled. During processing, a controller not illustrated also maintains the synchronization of output from photoelectric conversion elements 1a–1n of photosensitive unit 1 (the input to gamma correction circuit 4).

Due to the above-noted processing, the output from amplifier 45 amplifies the input of the expression a/|(reference area 1 data αm)−(reference area 2 data βm)|, as described in the first schematic example, and when a provision is made to control this gain, the gamma characteristics of photoelectric conversion elements 1a–1n of photosensitive unit 1 can be corrected to defined gamma characteristics.

Figure 9:
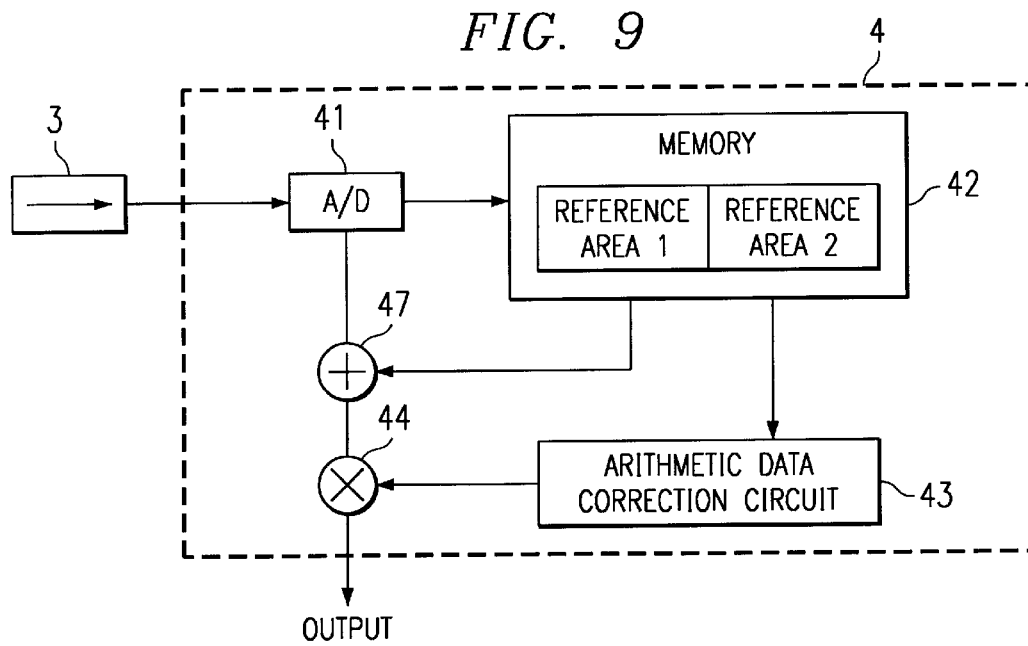
FIG. 9 is a block diagram showing a third schematic example of gamma correction circuit 4.

Next, as shown in FIG. 9, adding unit 47 may be added to the first schematic example of gamma correction circuit 4 shown in FIG. 7. In the drawing, processing when uniform beams (I) and (II) are respectively projected on photosensitive unit 1 is identical to processing in the first schematic example, but when image sensing on a medium to be copied begins, the output from photoelectric conversion elements 1a–1n of photosensitive unit 1, read by sequential reading means 3 and input to gamma correction circuit 4, are converted to digital data by A/D converter 41 and output to adding unit 47. At such time, digital data converted by A/D converter 41 are not transferred to memory 42. At the same time, among data stored in reference area 1 of memory 42 (data stored in reference area 2 is also acceptable), data based on output from photoelectric conversion elements, and subsequently output by sequential reading means 3, are output to adding unit 47. Adding unit 47 calculates the difference between the digital data from A/D converter 41 and reference area 1 of memory 42 and outputs the result to multiplier unit 44. At the same time, among digital data stored in reference area 1 and reference area 2 of memory 42, digital data from photoelectric conversion elements corresponding to output read by sequential reading means 3 are transferred to arithmetic data correction circuit 43, and arithmetic data correction circuit 43 calculates the expression a/|(reference area 1 data αm)−(reference area 2 data βm)| and outputs the result to multiplier unit 44. Here, "a" is a selected constant and determines the number of output bits for gamma correction circuit 4. Multiplier unit 44 multiplies the data from adding unit 47 and the above-noted calculated data from arithmetic data correction circuit 43 and outputs the result. This processing is carried out for each output from photoelectric conversion elements 1a–1n of photosensitive unit 1 while a controller not illustrated maintains synchronization.

If the sensitivity of photoelectric conversion element "X" in photosensitive unit 1 is termed "x", the output Vx(L) of photoelectric conversion element X when light quantity L is projected is:

$$Vx(L) \, x \cdot L$$

And because logarithmic conversion unit 2 carries out a logarithmic conversion, $$Vx(L) \cdot \ln(xL) = \ln(x) + \ln(L) \qquad \text{Eq. 1}$$

Similarly, the output Vx(L') of photoelectric conversion element X when light quantity L' is projected is:

$$Vx(L') \, \ln(x) + \ln(L') \qquad \text{Eq. 2}$$

Then according to (1)–(2):

$$Vx(L) - Vx(L') \, \ln(L) - \ln(L') \qquad \text{Eq. 3}$$

Since, as shown in Equation 1, ln(x) is a factor in the output of a photoelectric conversion element, if the sensitivity of photoelectric conversion elements differs, their output will differ, too, even if an identical light quantity L is projected onto these photoelectric conversion elements. However, when identical light quantity L' is projected onto these photoelectric conversion elements and their output (Equation 2) is calculated (Equation 3), sensitivity x is eliminated as a contributing factor, and the differing sensitivities of these photoelectric conversion elements can be corrected.

Thus, the data involved when adding unit 47 calculates the difference between digital data from A/D converter 41 and data from reference area 1 of memory 42, specifically, digital data from A/D converter 41 and (reference area 1 data m) from memory 42, are all based on identical output from photoelectric conversion elements. Consequently, this processing corrects discrepancies in the sensitivity of the photoelectric conversion elements.

In summary, the use of a circuit with the structure shown in FIG. 9 corrects the gamma characteristics of photoelectric conversion elements 1a–1n of photosensitive unit 1 to defined gamma characteristics and also corrects discrepancies in sensitivity.

Figure 10:
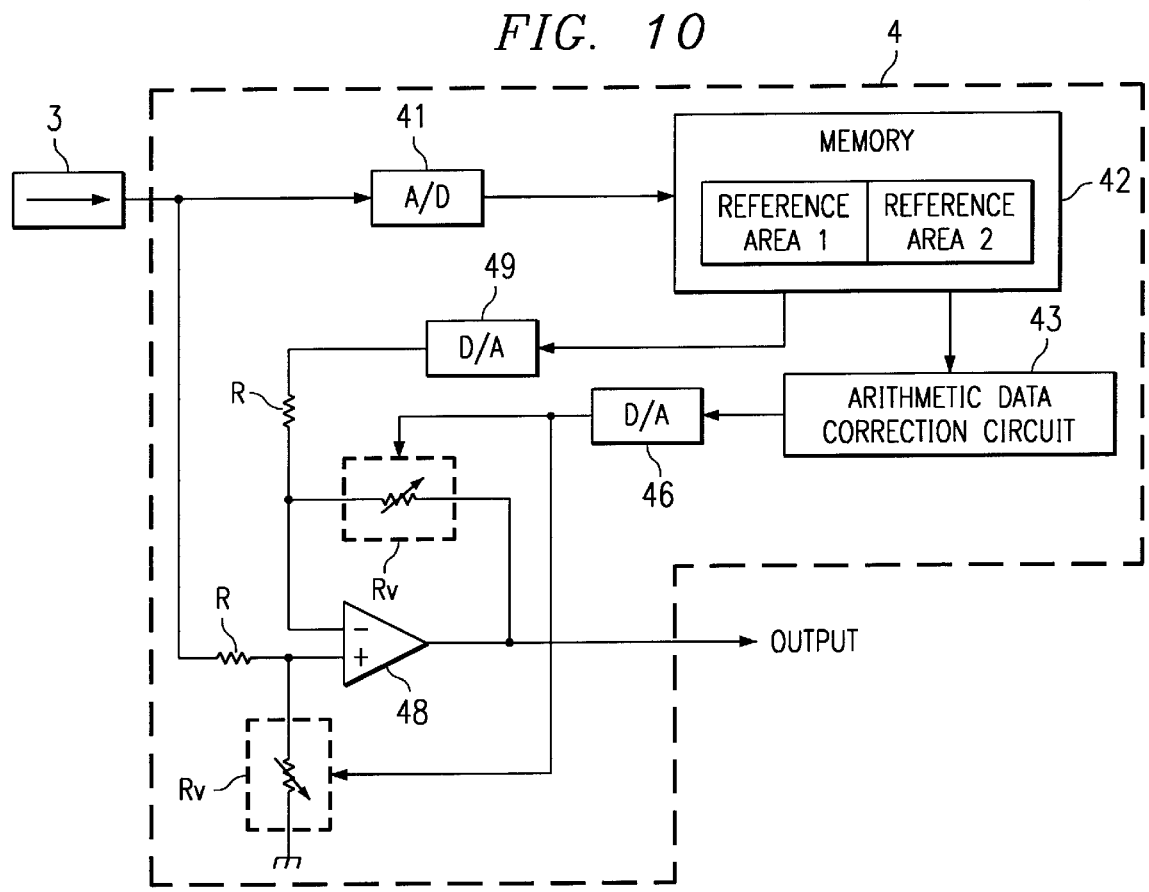
FIG. 10 is a block diagram showing a fourth schematic example of gamma correction circuit 4.

Next, as shown in FIG. 10, operational amplifier 48 may be provided in place of amplifier 45 and D/A converter 49 may be added, in the second schematic example of gamma correction circuit 4 shown in FIG. 8. In the figure, the non-inverting input terminal (+) of operational amplifier 48 is connected to the output of sequential reading means 3 by way of a resistor R and is grounded by way of a variable resistor RV. The inverting input terminal (−) is connected to memory 42 by way of a resistor R and D/A converter 49 in that order, and the output of operational amplifier 48 is returned by way of a variable resistor RV. The output of operational amplifier 48 constitutes the output of the circuit, and the resistance value of the two variable resistors RV is controlled by arithmetic data correction circuit 43.

In a circuit with this structure, processing carried out when uniform beams (I) and (II) are projected onto photosensitive unit 1 is identical to processing in a circuit with the structure shown in FIG. 8. Thereafter, when image sensing on a medium to be copied begins, output from photoelectric conversion elements 1a–1n of photosensitive unit 1, read by sequential reading means 3 and input to gamma correction circuit 4, does not pass through A/D converter 41 and is input to the non-inverting input terminal of operational amplifier 48 (+). At the same time, D/A converter 49 takes data stored in reference area 1 of memory 42 (data stored in reference area 2 are also acceptable) and makes an analog conversion of digital data from photoelectric conversion elements corresponding to output read by sequential reading means 3, and these data are input to the inverting input terminal (−) of operational amplifier 48. Meanwhile, among digital data stored in reference area 1 and reference area 2 of memory 42, digital data from photoelectric conversion elements that corresponds to output read from sequential reading means 3 are transferred to arithmetic data correction circuit 43, defined operations are carried out based on these data, and the resistance values of the two variable resistors RV are controlled according to these calculated results. This processing is performed while a controller not illustrated maintains synchronization with the output from photoelectric conversion elements 1a–1n of photosensitive unit 1 (the input to gamma correction circuit 4).

Where the output of sequential reading means 3 is V, and the output of D/A converter 49 which converts data from reference area 1 of memory 42 into analog form is V1, the output of operational amplifier 48, V0, is:

$$V0 = (RV/R)(V - V1)$$

Accordingly, the V−V1 factor corrects discrepancies in the sensitivity of photoelectric conversion elements of photosensitive unit 1. Though arithmetic data correction circuit 43 controls the RV in the RV/R term, arithmetic data correction circuit 43 calculates the expression a/|(reference area 1 data αm)−(reference area 2 data βm)|, and if RV is controlled so that RV/R approximates this calculated result, that is, if RV=a/R|(reference area 1 data αm)−(reference area 2 data βm)|, then, as previously described, the gamma characteristics of photoelectric conversion elements of photosensitive unit 1 can be corrected to defined gamma characteristics.

In summary, the use of a circuit with the structure shown in FIG. 10 simultaneously corrects both the gamma characteristics and discrepancies in the sensitivity of photoelectric conversion elements 1a–1n of photosensitive unit 1.

Figure 12:
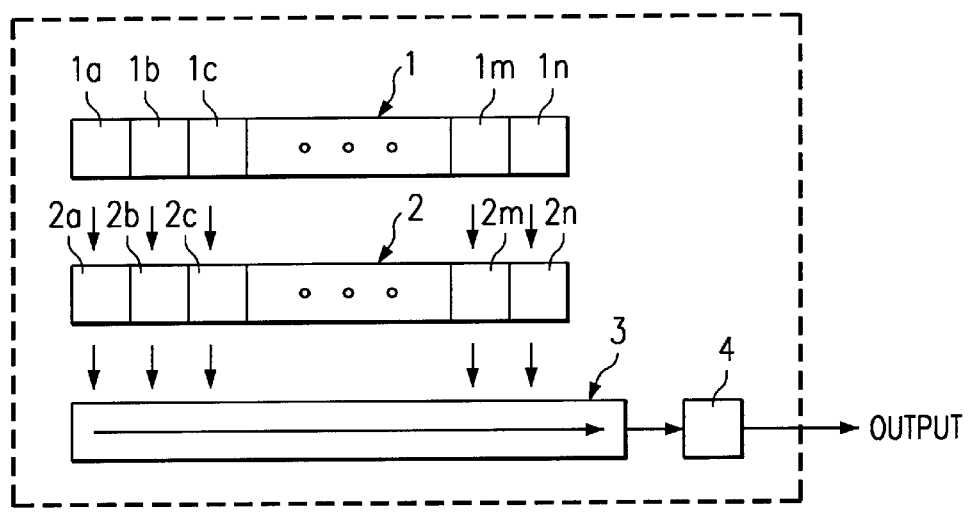
FIG. 12 is a block diagram of a solid state image sensing device which is a preferred embodiment of the present invention.
Figure 13:
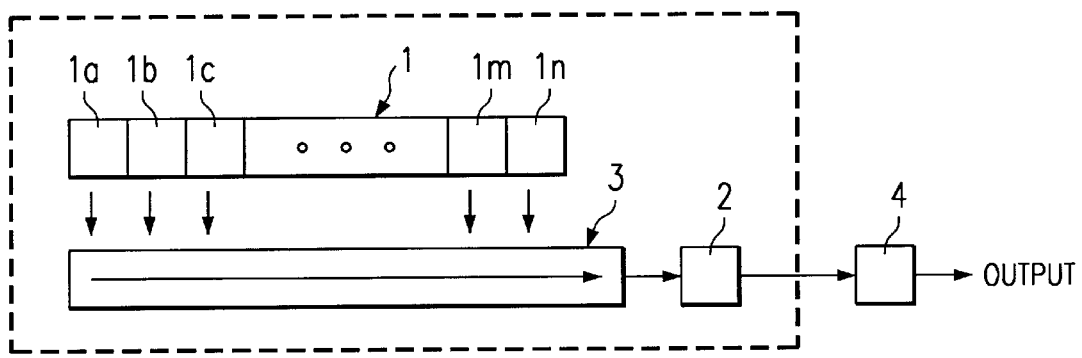
FIG. 13 is a block diagram of a solid state image sensing device which is a preferred embodiment of the present invention.
Figure 14:
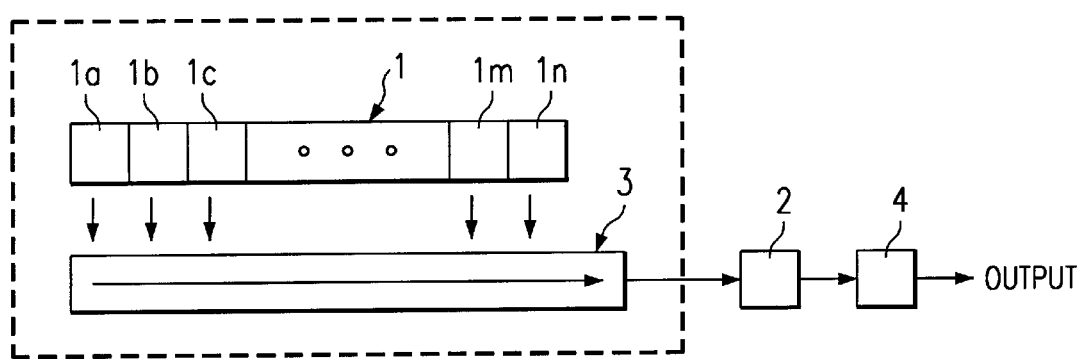
FIG. 14 is a block diagram of a solid state image sensing device which is a preferred embodiment of the present invention.

The present preferred embodiment of a solid state image sensing device comprises a structure in which photosensitive unit 1, logarithmic conversion unit 2, and sequential reading means 3 are all formed on the same substrate, and only gamma correction circuit 4 is an externally attached electrical circuit. However, as shown in FIG. 12, photosensitive unit 1, logarithmic conversion unit 2, sequential reading means 3, and gamma correction circuit 4 may all be formed on the same substrate. Additionally, as shown in FIG. 13, a structure in which the logarithmic conversion unit 2 in FIG. 1 is substituted for sequential reading means 3 is also acceptable (in this example, logarithmic conversion unit 2 possesses only one logarithmic conversion element). Or, as shown in FIG. 14, a structure is also acceptable in which photosensitive unit 1 and sequential reading means 3 are formed on the same substrate, and the externally attached electrical circuits are gamma correction circuit 4 and logarithmic conversion unit 2 comprising one logarithmic conversion element.

As a further example, if a provision is made to change the constant "a" externally in the expression a/|(reference area 1 data αm)−(reference area 2 data βm)| calculated by arithmetic data correction circuit 43 in gamma correction circuit 4, then the gamma characteristics of photoelectric conversion elements 1a–1n of photosensitive unit 1 can be corrected to various gamma characteristics.

Although the present invention has been fully described by way of examples with reference to the accompanying drawings, it is to be noted that various changes and modifications will be apparent to those skilled in the art. Therefore, unless such changes and modifications depart from the scope of the present invention, the should be construed as being included therein.

What is claimed is:

1. A solid state image sensing device comprising:
   a plurality of photoelectric conversion elements, each of which possesses its own gamma characteristic and receives an optical signal and outputs an electrical signal corresponding to an amount of light received;
   a logarithmic conversion unit for performing a logarithmic conversion on the electrical signal generated in the photoelectric conversion element as well as the output from the photoelectric conversion element;
   a gamma correction circuit for correcting discrepancies in the gamma characteristics of each output from the photoelectric conversion element once this output has undergone the logarithmic conversion by the logarithmic conversion unit,
   wherein the gamma correction circuit multiplies defined values for individual pixels and thereby performs gamma correction on an output value from a photoelectric conversion element once this output value has undergone a logarithmic conversion in a logarithmic conversion unit; and
   a memory for storing data output by each photoelectric conversion element and calculates defined values based on the thus stored data,
   wherein the memory stores a first output value when a beam of a first luminance is projected and stores a second output value when a beam of a second luminance different than the first is projected, and calculates the defined values based on the following expression:

$$a/|\alpha m - \beta m|$$

wherein:
   a=a selected constant;
   αm=the first output value; and
   βm=the second output value.

2. A solid state image sensing device in accordance with claim 1, wherein each respective photoelectric conversion element has the effect of doubling a respective photoelectric current, and each said element possesses a semiconductor substrate, an amorphous semiconductor layer disposed atop the semiconductor substrate, and an electrical field-applying electrode which applies an electrical field to the amorphous semiconductor layer.

3. A solid state image sensing device in accordance with claim 1, wherein the logarithmic conversion unit possesses a number of logarithmic conversion elements equal to the number of the photoelectric conversion elements, and performs a logarithmic conversion on the output from each photoelectric conversion element and provides an output.

4. A solid state image sensing device in accordance with claim 3, having a reading device which scans and thereby sequentially reads the output from a photoelectric conversion element once this output has undergone a logarithmic conversion, and which provides an output to the gamma correction circuit.

5. A solid state image sensing device in accordance with claim 1, wherein the logarithmic conversion unit possesses an element that performs a logarithmic conversion, sequentially performs a logarithmic conversion on an output from a photoelectric conversion element by means of a logarithmic conversion unit used in common for individual photoelectric conversion elements, and provides an output.

6. A solid state image sensing device in accordance with claim 1, wherein the aforementioned gamma correction circuit possesses an A/D converter for converting to digital data an output value from a photoelectric conversion element once this output value has undergone a logarithmic conversion by a logarithmic conversion unit, and then performs gamma correction by multiplying defined values for individual pixels.

7. A solid state image sensing device comprising:
   a plurality of photoelectric conversion elements, each of which possesses its own gamma characteristic and receives an optical signal and outputs an electrical signal corresponding to an amount of light received;
   a logarithmic conversion unit for performing a logarithmic conversion on the electrical signal generated in the photoelectric conversion element as well as the output from the photoelectric conversion element; and
   a gamma correction circuit for correcting discrepancies in the gamma characteristics of each output from the photoelectric conversion element once this output has undergone the logarithmic conversion by the logarithmic conversion unit,
   wherein the gamma correction circuit comprises:
      an A/D converter for converting to digital data an output value from a photoelectric conversion element once this output value has undergone a logarithmic conversion by a logarithmic conversion unit,
      a memory for storing output data converted to digital data for a plurality of individual photoelectric conversion elements, and
      an arithmetic circuit for calculating a defined value for a gamma correction based on data stored for a plurality of individual photoelectric conversion elements,
   wherein the gamma correction circuit carries out gamma correction by multiplying the thus calculated defined value by an output value from a photoelectric conversion element converted to digital data, and outputs the thus corrected data;
   wherein the memory stores reference data outputted when a uniform beam is projected on a photoelectric conversion element, and the gamma correction circuit adds the thus stored data to output data from a photoelectric conversion element converted to digital data, and discrepancies are thereby corrected, and the defined values are then used in multiplication, and an output is provided.

8. A solid state image sensing device comprising:
   a plurality of photoelectric conversion elements, each of which possesses its own gamma characteristic and receives an optical signal and outputs an electrical signal corresponding to an amount of light received;
   a logarithmic conversion unit for performing a logarithmic conversion on the electrical signal generated in the photoelectric conversion element as well as the output from the photoelectric conversion element; and
   a gamma correction circuit for correcting discrepancies in the gamma characteristics of each output from the photoelectric conversion element once this output has undergone the logarithmic conversion by the logarithmic conversion unit,
   wherein the gamma correction circuit comprises:
      an A/D converter for converting to digital data an output value from a photoelectric conversion element once this output value has undergone a logarithmic conversion by the logarithmic conversion unit,
      a memory for storing output data converted to digital data for a plurality of individual photoelectric conversion elements, an arithmetic circuit for calculating a defined value for a gamma correction based on data stored for a plurality of individual photoelectric conversion elements, wherein the gamma correction circuit carries out gamma correction by multiplying a calculated defined value by an analog output value from a photoelectric conversion element which has undergone a logarithmic conversion, and outputs the corrected analog data.

9. The solid state image sensing device of claim 8, wherein the aforementioned memory stores data output when a uniform beam is projected on a photoelectric conversion element; and in the aforementioned gamma correction circuit, data stored for each photoelectric conversion element are added to the output data from a photoelectric conversion element which has undergone a logarithmic conversion, and discrepancies are thereby corrected; and the aforementioned defined values are then used in multiplication, and an output is provided.

10. A solid state image sensing device comprising:

a photoelectric conversion unit provided with a plurality of photoelectric conversion elements, each of which has a different gamma characteristic and receives an optical signal and outputs an electrical signal corresponding to an amount of light received;

a logarithmic conversion unit for sequentially performing a logarithmic conversion on an electrical signal generated in each photoelectric conversion element;

an A/D converter for converting to digital data an output from the photoelectric conversion unit which has undergone a logarithmic conversion;

a memory for storing digital data converted by the A/D converter;

an arithmetic data correction circuit for calculating a corrected gamma characteristic value for a photoelectric conversion element based on data stored in the memory; and a correction circuit for correcting a gamma characteristic by multiplying the value calculated in the arithmetic data correction circuit with an output from a photoelectric conversion element which has undergone a logarithmic conversion in the logarithmic conversion unit;

wherein the memory stores a first output value when a beam of a first luminance is projected on a photoelectric conversion element and a second output value when a beam of a second luminance different than the first is projected on a photoelectric conversion element, and an arithmetic data correction circuit determines a corrected gamma characteristic value according to the expression:

$$a/|\alpha m - \beta m|$$

wherein:

a = a selected constant;

$\alpha m$ = the first output value; and $\beta m$ = the second output value.

* * * * *